United States Patent Office 3,159,602
Patented Dec. 1, 1964

3,159,602
PREPARATION OF POLYMERIC PHOSPHATES
Chester E. Hamilton, Cheshire, and Rudi F. W. Rätz, Hamden, Conn., assignors to Olin Mathieson Chemical Corporation, New Haven, Conn., a corporation of Virginia
No Drawing. Filed June 7, 1962, Ser. No. 200,957
3 Claims. (Cl. 260—61)

This invention relates to novel polymeric compositions and more particularly to compositions containing a recurring spiro unit with two phosphorus atoms therein.

A copending application, S.N. 175,270, filed on February 23, 1962, disclosed an improved process for the preparation of 3,9-dichloro-2,4,8,10-tetraoxa-3,9-diphosphaspiro[5.5]undecane-3,9-dioxide. This material is prepared by the reaction of pentaerythritol with phosphoryl chloride and is represented by the following structural formula.

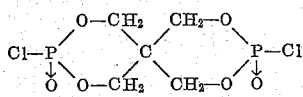

The spiro ring in the above compound is characterized by unusuual stability, and it was postulated that this dichloride could be utilized in the preparation of a stable polymer having a high resistance to combustion.

Therefore it was the principal object of this invention to utilize the illustrated dichloride in the preparation of a novel polymer having a phosphorus-containing spiro ring.

Another object of this invention was to prepare a polymeric composition characterized by unusually high resistance to combustion.

Still another object of this invention was to prepare a novel non-combustible polymer which could be incorporated into cellulosic coating materials and lacquers.

Another object of this invention was to devise a method wherein a non-combustible polymer could be prepared from the phosphorus-containing dichloride.

Other objects will be apparent from or will be disclosed in the following discussion.

These objects have been accomplished in accordance with the present invention. It has been found that 3,9-dichloro - 2,4,8,10 - tetraoxa - 3,9 - diphosphaspiro[5.5] undecane-3,9-dioxide can be condensed with dihydric phenols to obtain novel polymeric structures having the following recurring unit wherein R is an arylene group.

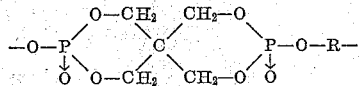

The condensation can be carried out by reacting the two components alone, or if desired selected solvents may be advantageously employed during the condensation. A wide variety of dihydric phenols may be used in the practice of this invention. For example, hydroquinone, resorcinol and pyrocatechol all can be reacted with the dichloride to obtain desired polymeric compositions. Other dihydric phenols which are especially useful in the general reaction are p,p'-bisphenol and 2,2-(bis-p-hydroxyphenyl) propane which is also known as Bisphenol A.

Other dihydric phenols which can be advantageously employed in the condensation with the dichloride are di(4-hydroxyphenyl) sulfide, di(4-hydroxyphenyl) sulfone, di(4-hydroxy-3-methylphenyl) sulfone, p,p'-dihydroxybenzophenone, di(4-hydroxy-3-methylphenyl) - dimethylmethane, di(4-hydroxy-3-chlorophenyl)-dimethylmethane, di(4-hydroxy-3-chlorophenyl) methylmethane and other similar derivatives.

The following experimental information will serve to illustrate the preparation of the polymers described herein. Several preparations are described in detail including polycondensations performed both in the presence and absence of solvents. It is to be understood that these examples are not to be considered as limiting the scope of this invention as there are many possible modifications which would be obvious to one skilled in the art.

Example 1

A 23 cm. long side-arm test tube having a diameter of 2 cm. was charged with 2.97 g. (0.01 mole) of 3,9-dichloro - 2,4,8,10 - tetraoxa - 3,9 - diphosphaspiro[5.5] undecane-3,9-dioxide, and 2.28 g. (0.01 mole) of Bisphenol A which had a melting point of 159.5°–160° C. A rubber stopper bearing a glass capillary was placed in the upper tube opening while the side-arm outlet was connected with two drying tubes, one filled with calcium chloride and the other with phosphorus pentoxide. The air in the reaction tube was displaced by passing in a slow stream of nitrogen which had been treated to remove oxygen and moisture. An oil bath was used to heat the tube, and at 170° C. evolution of HCl began to occur. This temperature was maintained for a half hour, and then the temperature was raised to 185° C. for three hours. Finally the temperature was raised to 205° C. and a vacuum of 0.01 mm. applied for thirty minutes. After this period, the reaction system was kept at 140° C./0.01 mm. for eight hours. Vacuum was then removed, and the mixture was allowed to cool to room temperature under a nitrogen atmosphere. The product was an amber transparent resin having a melting point of 178–180° C. and a softening point of about 125° C.

The polycondensation apparatus and technique utilized in Example 1 was also employed in the following five examples.

Example 2

Into the reaction tube was placed 2.97 g. (0.01 mole) of dichloride and 2.51 g. (0.011 mole) of Bisphenol A. The mixture was heated to 150–155° C. for one hour and then at 165° C. for an extended period of four days. The temperature was then raised to 185° C. for eighteen hours. Finally a vacuum of 0.1 mm. was applied at this latter temperature for a half hour before the mixture was cooled to room temperature. A red-brown transparent resin was obtained having a melting point of 180° C. and a softening point of 128° C.

Example 3

Into the reaction tube was placed 2.97 g. (0.01 mole) of the dichloride and 1.10 g. (0.01 mole) of hydroquinone. The reaction mixture was heated at 165° C. for one hour, and then the temperature was gradually increased to 185° C. over a two hour period. After cooling, a tan hard resinous material was obtained which had a melting point >300° C.

Example 4

Into the reaction tube was placed 2.97 g. (0.01 mole) of the dichloride and 1.21 g. (0.011 mole) of hydroquinone. The mixture was heated at 200° C. for sixteen hours and then maintained at 200° C./0.1 mm. for a further period of one hour. After cooling to room temperature, the product was a light brown hard resin which melted at >312° C. and had a softening point of about 230° C.

Example 5

In this experiment, a polymer was formed by condensing the dichloride with Bisphenol A and hydroquinone as the other components. Into the reaction tube was placed 2.97 g. (0.01 mole) of dichloride, 0.88 g. (0.008 mole) of hydroquinone and 0.46 g. (0.002 mole) of Bisphenol A. The mixture was heated at 158° C. for one hour and then at 185° C. for one hour. Finally the mixture was heated at 225° C. for three hours before being allowed to cool to room temperature under a nitrogen atmosphere. The product was a rubbery translucent red material which strongly adhered to glass. It had a melting point of 278-80° C. and a softening point of about 130° C.

*Example 6*

Into the reaction tube was placed 2.97 g. (0.01 mole) of dichloride, 0.66 g. (0.006 mole) of hydroquinone and 0.91 g. (0.004 mole) of Bisphenol A. The mixture was heated at 157° C. for two hours and then at 180° C. for two hours longer. Finally the mixture was heated at 228° C. for ten additional hours before being cooled to room temperature. A brown translucent resinous material was obtained which melted at about 260-280° C. and had a softening point of about 120° C.

*Example 7*

Anhydrous dimethylformamide (50 cc.) was placed in a reaction flask equipped with reflux condenser together with 2.97 g. (0.01 mole) of dichloride and 2.28 g. (0.01 mole) of Bisphenol A. The clear solution was heated at 170° C. for five hours under a nitrogen atmosphere. After removing the solvent under vacuum, dimethylformamide-hydrochloride was removed from the reaction product by heating at 170° C./0.01 mm. for five hours. After cooling, the product obtained was a hard, amber, translucent material which was chlorine free. It had a melting point of 180° C. and a softening point of about 100° C.

*Example 8*

Anhydrous dimethylformamide was placed in a reaction flask equipped with reflux condenser together with 2.97 g. (0.01 mole) of dichloride and 1.86 g. (0.01 mole) of p,p'-bisphenol. The clear solution was heated for five hours at 170° C. under a nitrogen atmosphere. Then the solvent was removed at 170° C./14 mm. for five hours followed by a final five hour stripping at 170° C./0.01 mm. After cooling to room temperature, the product was a translucent light brown resin which was slightly tacky at room temperature.

The condensation reactions can be performed under a wide variety of experimental conditions with respect to reaction time and temperature. The polymers of this invention have been prepared after only three hours of heating the components, but others have been prepared after prolonged heating of four to five days. However in general, suitable polymer compositions are obtained after a heating period of from five to fifteen hours.

Generally, equimolar quantities of the dihydric phenol and the dichloride should be used in the condensation process, but the desired polymeric compositions have been obtained when an excess of the phenols has been used.

As illustrated in the first six of the above examples, the desired condensations can be carried out in the absence of a solvent. Under these conditions, the reactions proceed readily at a temperature range of about 140–230° C., although a preferred temperature range of about 170–215° C. is desirable. When no solvent is used, the hydrogen chloride by-product is removed by volatilization or by vacuum techniques.

Solvents can be employed during the condensation process if so desired. It has been found that anhydrous dimethylformamide and dimethylacetamide are effective solvents. When such solvents are used, the preferred condensation temperature should be maintained at about 150–175° C. In general, it may be stated that the polymer obtained under these conditions has a much lower softening point range than the product obtained in the absence of a solvent. This is probably due to the fact that traces of unremoved solvent act as a polymer plasticizer. The melting point range of prepared polymers does not appear to vary with the use of a solvent. The utilization of solvents during the condensation process is also useful since the above mentioned solvents form salts with hydrogen chloride which can be removed from the reaction mixture in vacuo.

All the polyphosphate ester products obtained were solids which had softening points of above 100° C. Other properties such as color and melting points depended on the phenolic component used in the reaction. The products obtained were of varied color ranging from amber to a red-brown.

As noted in the above discussion, the polymer prepared from Bisphenol A and dichloride had a melting point of about 180° C. whether prepared in presence or absence of a solvent. However the softening point range was lowered considerably if the condensation was carried out in the presence of a solvent.

The most interesting property of these novel polymeric compositions is the complete incapacity for burning or supporting combustion. These products have been found to have special utility as fire retardant additives in inflammable plastics. They are particularly useful as additives for imparting flameproofing characteristics to cellulosic materials designed for use in coatings and lacquers.

What is claimed is:

1. The method of preparing a solid polymeric phosphate which comprises reacting 3,9 - dichloro - 2,4,8,10-tetraoxa-3,9-diphosphaspiro[5.5]undecane - 3,9-dioxide at a temperature of about 140° C. to about 230° C. with at least an equimolar quantity of a compound having the structure $R(OH)_2$, R being an arylene group, removing the formed hydrochloric acid and cooling the reaction product.

2. The method of claim 1 wherein a reaction temperature of about 170° C. to about 215° C. is utilized.

3. The method of preparing a solid polymeric phosphate which comprises dissolving 3,9-dichloro-2,4,8,10-tetraoxa-3,9-diphosphaspiro[5.5]undecane - 3,9-dioxide in a solvent selected from the group consisting of dimethylformamide and dimethylacetamide, heating said solution with at least an equimolar amount of $R(OH)_2$ at a temperature of about 150° C. to about 175° C., R being an arylene group, removing the formed hydrochloric acid and solvent and cooling the reaction product.

References Cited by the Examiner

UNITED STATES PATENTS

| | | | |
|---|---|---|---|
| 2,964,477 | 12/60 | Pilat | 260—61 |
| 3,053,878 | 9/62 | Friedman | 260—461 |
| 3,090,799 | 5/63 | Wahl | 260—461 |

OTHER REFERENCES

Charonnat: Ann. Pharm. Franc., volume 10, pages 666–669 (1952).

WILLIAM H. SHORT, *Primary Examiner*.